United States Patent
Onoyama et al.

(10) Patent No.: US 7,514,124 B2
(45) Date of Patent: Apr. 7, 2009

(54) WHITE ELECTRICALLY CONDUCTIVE PRIMER COMPOSITION AND METHOD FOR FORMING MULTILAYER COATING FILM

(75) Inventors: Hiroyuki Onoyama, Hiratsuka (JP); Yoshizumi Matsuno, Hadano (JP); Katsuichi Chiba, Yokkaichi (JP); Yuichi Yasuda, Yokkaichi (JP)

(73) Assignees: Kansai Paint Co., Ltd., Amagasaki-shi (JP); Ishihara Sangyo Kaisha, Ltd., Osaka-shi (JP)

( * ) Notice: Subject to any disclaimer, the term of this patent is extended or adjusted under 35 U.S.C. 154(b) by 624 days.

(21) Appl. No.: 10/565,297

(22) PCT Filed: Jul. 22, 2004

(86) PCT No.: PCT/JP2004/010761

§ 371 (c)(1),
(2), (4) Date: Jan. 20, 2006

(87) PCT Pub. No.: WO2005/012449

PCT Pub. Date: Feb. 10, 2005

(65) Prior Publication Data

US 2006/0188654 A1    Aug. 24, 2006

(30) Foreign Application Priority Data

Jul. 23, 2003    (JP)    ............................ 2003-278555

(51) Int. Cl.
*B05D 1/04*    (2006.01)
*C09D 123/28*    (2006.01)

(52) U.S. Cl. ........................ 427/475; 427/470; 524/497; 524/904

(58) Field of Classification Search ........................ None
See application file for complete search history.

(56) References Cited

U.S. PATENT DOCUMENTS

| 4,452,830 A | 6/1984 | Yoshizumi | ................... | 427/215 |
| 4,880,703 A | 11/1989 | Sakamoto et al. | ........... | 428/378 |
| 6,632,276 B1 | 10/2003 | Vogt | ........................... | 106/417 |
| 2006/0208228 A1 | 9/2006 | Chiba et al. | ................. | 252/500 |

FOREIGN PATENT DOCUMENTS

| EP | 1600484 | 11/2005 |
| EP | 1647997 | 4/2006 |
| JP | 4-154621 | 5/1992 |
| JP | 6-17231 | 3/1994 |
| JP | 6-207118 | 7/1994 |
| JP | 7-90150 | 4/1995 |
| JP | 2001-139875 | 5/2001 |
| JP | 2002-20107 | 1/2002 |
| JP | 2002-121462 | 4/2002 |
| JP | 3357107 | 10/2002 |
| JP | 2004-75735 | 3/2004 |

OTHER PUBLICATIONS

European Search Report dated Jul. 19, 2006.

*Primary Examiner*—Frederick J Parker
(74) *Attorney, Agent, or Firm*—Kratz, Quintos & Hanson, LLP

(57) ABSTRACT

The present invention provides a white conductive primer coating composition comprising (a) 100 parts by weight of a resin mixture of a chlorinated polyolefin resin with a chlorine content of 10 to 40 wt. %, and at least one modifier resin selected from the group consisting of acrylic resins, polyester resins and polyurethane resins, (b) 5 to 50 parts by weight of a crosslinking agent, and (c) 10 to 250 parts by weight of a white conductive titanium dioxide powder which comprises titanium dioxide particles having on their surfaces a conductive layer comprising tin oxide and phosphorus, and in which the content (A) of metallic elements with valencies of 4 or less contained as impurities is no more than 0.1; and a method for forming a multilayer coating film using the composition.

11 Claims, No Drawings

WHITE ELECTRICALLY CONDUCTIVE PRIMER COMPOSITION AND METHOD FOR FORMING MULTILAYER COATING FILM

TECHNICAL FIELD

The present invention relates to a white conductive primer coating composition and a method for forming a multilayer coating film.

BACKGROUND ART

Automotive bumpers and like plastic substrates are generally coated by spray coating, such as air spray coating or airless spray coating. In recent years, however, electrostatic coating, which shows excellent deposition efficiency and thus discharges only a small amount of coating material to the environment, has been finding wider application.

Since plastic substrates generally have high electrical resistance (usually about $10^{12}$ to about $10^{16}$ Ω/sq.), it is extremely difficult to electrostatically apply a coating material to plastic substrate surfaces directly. Therefore, before electrostatic application, conductivity is imparted to plastic substrates themselves or their surfaces so that the substrates have a surface electrical resistance below $10^9$ Ω/sq.

For example, before electrostatic application of a coating material to a plastic substrate, a conductive primer may be applied to impart conductivity to the substrate. A coating material containing a resin component and conductive filler is conventionally used as such a conductive primer.

Particles of conductive carbon, metals, conductive metal oxides, etc. have been heretofore used as conductive fillers. The form or shape of such conductive filler particles is usually a powder, needles, fibers, spheres or the like.

When a carbon powder or carbon fibers are added to a coating material as a conductive filler, although a relatively small amount can impart conductivity, the resulting coating layer has reduced whiteness, i.e., reduced brightness, and thus affects the color properties, such as brightness, of the upper coating layer to be formed thereon.

Metal powders have high conductivity, but need to be added in large amounts, since the particles of metal powders need to be in contact with one another to form an electrical conduction path in a coating layer. Thus, use of a metal powder as a conductive filler impairs the whiteness of the coating layer and stability of the coating material.

Japanese Examined Patent Publication No. 1994-17231 discloses, as a conductive filler that does not decrease the brightness of the coating film, a white conductive titanium oxide filler comprising high-quality titanium oxide particles having on their surfaces a conductive layer comprising tin oxide and antimony oxide. However, since recently there are concerns about toxicity of antimony, such a conductive filler is not preferable.

Japanese Patent No. 3357107 discloses, as a conductive filler for coating materials, a white conductive titanium dioxide powder comprising titanium dioxide particles having on their surfaces a tin oxide covering layer containing 0.1 to 10 wt. % of phosphorus. The powder contains no antimony and thus causes no toxicity problems, but has a problem in that it is difficult to a form a layer with good conductivity on the titanium dioxide particle surfaces. Therefore, coating layers formed from coating materials containing the powder as a conductive filler do not have stable conductivity, and thus cannot be electrostatically coated in some cases.

DISCLOSURE OF THE INVENTION

An object of the present invention is to provide a white conductive primer coating composition that can form on a plastic substrate a coating layer with high brightness and sufficient conductivity for electrostatic application of an upper coating layer.

Another object of the present invention is to provide a method for forming a multilayer coating film on a plastic substrate using the primer coating composition.

The present inventors studied the causes of difficulties in forming a layer with good conductivity on the surfaces of titanium dioxide particles in the white conductive titanium dioxide powder disclosed in Japanese Patent No. 3357107. As a result, the inventors found that metallic elements with valencies of 4 or less contained as impurities in the raw material titanium dioxide spread throughout the conductive tin oxide covering layer containing phosphorus, thereby reducing the conductivity; and that metallic elements with valencies of 4 or less contained as impurities in the conductive layer also lower the conductivity.

Based on the above findings, the present inventors conducted extensive research to develop a white conductive primer coating composition that can form a coating layer with sufficient conductivity and high brightness on a plastic substrate.

As a result, the present inventors found that the above objects can be achieved by using as a conductive filler a white conductive titanium dioxide powder that comprises titanium dioxide particles having on their surfaces a conductive layer comprising tin oxide and phosphorus, and that contains no more than a specific amount of metallic elements with valencies of 4 or less as impurities. More specifically, the inventors found that a primer coating composition obtained by blending the titanium dioxide powder with a specific chlorinated polyolefin resin, a specific modifier resin and a crosslinking agent can impart to a plastic substrate sufficient conductivity to electrostatically apply an upper coating composition thereon; and that the coating layer of the primer coating composition has high brightness. The present invention was accomplished based on these new findings.

The present invention provides the following white conductive primer coating composition and method for forming a multilayer coating film using the coating composition.

1. A white conductive primer coating composition comprising:

(a) 100 parts by weight of a resin mixture of a chlorinated polyolefin resin with a chlorine content of 10 to 40 wt. %, and at least one modifier resin selected from the group consisting of acrylic resins, polyester resins and polyurethane resins;

(b) 5 to 50 parts by weight of a crosslinking agent; and (c) 10 to 250 parts by weight of a white conductive titanium dioxide powder which comprises titanium dioxide particles having on their surfaces a conductive layer comprising tin oxide and phosphorus, and in which the content (A) of metallic elements with valencies of 4 or less contained as impurities is no more than 0.1; the content (A) being calculated by the following formula (1)

$$(A) = (M_1) \times (4-n_1) + (M'_2) \times (4-n_2) + (M'_3) \times (4-n_3) + (M_4) \times (4-n_4) + \ldots + (M_X) \times (4-n_X) \quad \text{Formula (1)}$$

wherein $M_1$, $M_2$, $M_3$, $M_4$, … $M_X$ are the atomic ratios of metallic elements with valencies of 4 or less to Sn of the tin oxide in the white conductive titanium dioxide powder; $n_1$, $n_2$, $n_3, n_4, \ldots n_X$ are the valencies of metallic elements having atomic ratios of $M_1, M_2, M_3, M_4, \ldots M_X$, respectively; and X in $M_X$ and $n_X$ is the number of such metallic elements contained in the white conductive titanium dioxide powder, and may be a natural number 1 or more.

2. A primer coating composition according to item 1, wherein, in component (a), the proportions of the chlorinated polyolefin resin and modifier resin are 10 to 90 wt. % and 90 to 10 wt. %, respectively, of the total weight of these resins.

3. A primer coating composition according to item 1, wherein, in the white conductive titanium dioxide powder (c), the amount of tin oxide in the conductive layer is 0.015 to 0.3 g on a $SnO_2$ basis per square meter of surface area of the titanium dioxide.

4. A primer coating composition according to item 1, wherein, in the conductive layer of the white conductive titanium dioxide powder (c), the proportion of phosphorus to tin oxide is from 0.10 to 0.50 in terms of the P/Sn atomic ratio.

5. A primer coating composition according to item 1, wherein, in the white conductive titanium dioxide powder (c), the content (B) of metallic elements with valencies of 4 or less contained as impurities in the titanium dioxide is no more than 0.02; the content (B) being calculated by the following formula (2):

$$(B) = (M'_1) \times (4 - n'_1) + (M'_2) \times (4 - n'_2) + (M'_3) \times (4 - n'_3) + (M'_4) \times (4 - n'_4) + \ldots + (M'_Y) \times (4 - n'_Y) \quad \text{(Formula 2)}$$

wherein $M'_1, M'_2, M'_3, M'_4, M'_Y$ are the atomic ratios of metallic elements with valencies of 4 or less to Ti of the titanium dioxide; $n'_1, n'_2, n'_3, n'_4, n'_Y$ are the valencies of metallic elements with atomic ratios of $M'_1, M'_2, M'_3, M'_4, \ldots M'_Y$, respectively; and Y in $M'_Y$ and $n'_Y$ is the number of metallic elements contained in the titanium dioxide, and may be a natural number 1 or more.

6. A primer coating composition according to item 1, further comprising (d) up to 200 parts by weight of a white pigment.

7. A primer coating composition according to item 1, the composition being capable of forming a coating layer with a lightness (L* value) of 80 or more as determined according to the L*a*b* color system defined in JIS Z 8729, by being applied to a plastic substrate and cured by heating.

8. A primer coating composition according to item 1, the composition, when formed into an uncured or cured coating layer applied on a plastic substrate, having a surface electrical resistance less than $10^9$ Ω/sq.

9. A primer coating composition according to item 1, which is an aqueous coating composition.

10. A method for forming a multilayer coating film, the method comprising the steps of:

(1) applying a white conductive primer coating composition according to item 1 to a plastics substrate;

(2) electrostatically applying a colored base coating composition on the uncured coating layer of the primer coating composition;

(3) electrostatically applying a clear coating composition on the uncured coating layer of the base coating composition; and then (4) curing by heating the three-layer coating comprising the primer coating composition, colored base coating composition and clear coating composition.

11. A method for forming a multilayer coating film, the method comprising the steps of:

(1) applying a white conductive primer coating composition according to item 1 to a plastics substrate, followed by curing by heating;

(2) electrostatically applying a colored base coating composition on the cured coating layer of the primer coating composition;

(3) electrostatically applying a clear coating composition on the uncured coating layer of the base coating composition; and then (4) curing by heating the two-layer coating comprising the colored base coating composition and clear coating composition.

White Conductive Primer Coating Composition

The white conductive primer coating composition of the present invention comprises specific amounts of (a) a resin mixture of a chlorinated polyolefin resin with a chlorine content of 10 to 40 wt. %, and at least one modifier resin selected from the group consisting of acrylic resins, polyester resins and polyurethane resins; (b) a crosslinking agent; and (c) a white conductive titanium dioxide powder which comprises titanium dioxide particles having on their surfaces a conductive layer comprising tin oxide and phosphorus, and in which the content (A) of metallic elements with valencies of 4 or less contained as impurities is no more than 0.1, the content (A) being calculated by the above formula (1). The primer coating composition may be aqueous or organic solvent-based.

Resin Mixture (a) of Chlorinated Polyolefin Resin and Modifier Resin

A mixed resin of a chlorinated polyolefin resin and specific modifier resin(s) is used as a resin component of the white conductive primer coating composition of the present invention. In the resin component, the chlorinated polyolefin resin is used to improve the adhesion of the coating layer, and the modifier resin(s) is used to adjust the flexibility, stiffness and other properties of the coating layer and improve the film-forming properties.

Chlorinated Polyolefin Resin

The chlorinated polyolefin resin used in the composition of the present invention is a chlorination product of a polyolefin. Examples of usable base polyolefins include radical homopolymers and copolymers of at least one olefin selected from ethylene, propylene, butene, methylbutene, isoprene, etc.; and radical copolymers of such olefins with vinyl acetate, butadiene, acrylic ester, methacrylic ester, etc.

The chlorinated polyolefin resin usually has a weight average molecular weight of about 30,000 to about 200,000, and preferably about 50,000 to about 150,000.

The chlorine content of the chlorinated polyolefin resin is about 10 to about 40 wt. %. Chlorine contents within the above range do not impair the solubility in solvents, and thus the primer coating composition can be sufficiently atomized during spray coating. Further, such chlorine contents do not reduce the solvent resistance of the resulting coating layer. A preferable chlorine content is about 12 to about 35 wt. %.

Examples of preferable chlorinated polyolefin resins include chlorinated polyethylene, chlorinated polypropylene, chlorinated ethylene-propylene copolymers, chlorinated ethylene-vinyl acetate copolymers, etc. Also usable are resins obtained by graft polymerization of chlorinated polyolefins with polymerizable monomers.

Examples of polymerizable monomers usable for such graft polymerization include alkyl(meth)acrylates, alkoxyalkyl(meth)acrylates, glycidyl(meth)acrylates, adducts of glycidyl(meth)acrylates with monocarboxylic acids, hydroxyalkyl(meth)acrylates, acrylic acid, methacrylic acid, etc. In order to make the chlorinated polyolefin resin water-soluble or water-dispersible, one or more hydrophilic monomers, such as a polymerizable unsaturated dicarboxylic acid or an anhydride thereof, may be used as polymerizable monomers to be graft-polymerized. Polymerizable unsaturated dicarboxylic acids and anhydrides thereof are compounds having one polymerizable unsaturated bond and two or more carboxy groups per molecule, or anhydrides thereof. Examples include maleic acid and its anhydride, itaconic acid and its anhydride, citraconic acid and its anhydride, etc.

The proportion of such polymerizable monomer(s) to be used is not limited as long as gelation does not occur, and is preferably about 10 to about 80 wt. %, and more preferably about 30 to about 60 wt. %, relative to the chlorinated polyolefin.

The graft polymerization of the polymerizable monomer(s) to the chlorinated polyolefin resin can be performed by a known method.

The modified chlorinated polyolefin, obtained by graft-polymerizing a polymerizable unsaturated dicarboxylic acid or an anhydride thereof so as to render the chlorinated polyolefin resin water-soluble or water-dispersible, preferably has a saponification value of about 10 to about 60 mg KOH/g, and more preferably about 20 to about 50 mg KOH/g.

When the chlorinated polyolefin resin to which a polymerizable unsaturated dicarboxylic acid or an anhydride thereof has been graft-polymerized is rendered water-soluble or water-dispersible, it is preferable to neutralize part or all of the carboxy groups in the molecule with an amine compound.

Examples of amine compounds include triethylamine, tributylamine, dimethylethanolamine, triethanolamine and other tertiary amines; dimethylamine, dibutylamine, diethanolamine and other secondary amines; etc. To impart water solubility or water dispersibility, such amine compounds can be used in combination with surfactants.

Modifier Resin

The modifier resin used in combination with the chlorinated polyolefin resin in the composition of the present invention adjusts the flexibility, stiffness and other properties of the coating layer to be obtained, and improves film-forming properties. The modifier resin is at least one member selected from the group consisting of acrylic resins, polyester resins and polyurethane resins.

The proportions of the chlorinated polyolefin resin and the modifier resin are preferably about 10 to about 90 wt. % and about 90 to about 10 wt. %, respectively, of the total weight of these resins, so as to achieve excellent effects with respect to both the coating adhesion improvement by the chlorinated polyolefin resin and modification by the modifier resin. More preferable proportions are about 20 to 70 wt. % of the chlorinated polyolefin resin and about 80 to about 30 wt. % of the modifier resin. The above proportions are based on the weight of the solids.

Hydroxy-containing acrylic resins are preferable as acrylic resins for use as modifier resins. When the primer coating composition of the present invention is aqueous, it is preferable to use an acrylic resin containing, as well as hydroxy groups, carboxy groups to impart solubility or dispersibility in water, crosslinkability, etc.

Hydroxy-containing acrylic resins can be obtained by polymerizing a-hydroxy-containing monomer, alkyl(meth) acrylate monomer, and optionally other monomers, by a known polymerization method, such as a solution polymerization method or the like.

Hydroxy-containing monomers are compounds having a hydroxy group and polymerizable unsaturated group. Examples thereof include hydroxyethyl(meth)acrylate, hydroxypropyl(meth)acrylate, hydroxybutyl(meth)acrylate, other monoesters of (meth)acrylic acid with $C_{2-10}$ diols, etc.

Examples of alkyl (meth)acrylate monomers include methyl(meth)acrylate, ethyl(meth)acrylate, propyl(meth)acrylate, butyl(meth)acrylate, hexyl(meth)acrylate, 2-ethylhexyl (meth)acrylate, lauryl(meth)acrylate, stearyl(meth)acrylate, other monoesters of (meth)acrylic acid with $C_{1-20}$ monohydric alcohols, etc.

The other monomers are compounds that are other than hydroxy-containing monomers and alkyl (meth)acrylate monomers and have a polymerizable unsaturated bond. Examples of such monomers include (meth)acrylic acid, maleic acid and other carboxy-containing monomers; glycidyl(meth)acrylate and other epoxy-containing monomers; (meth)acrylamide, acrylonitrile, styrene, vinyl acetate, vinyl chloride, etc.

It is usually suitable that such hydroxy-containing acrylic resins have a hydroxy value of about 10 to about 100 mg KOH/g, and preferably about 50 to about 90 mg KOH/g; an acid value of about 10 to about 100 mg KOH/g, and preferably about 30 to about 60 mg KOH/g; and a number average molecular weight of about 2,000 to about 100,000, and preferably about 3,000 to about 50,000.

Polyester resins for use as modifier resins can usually be obtained by an esterification reaction of a polybasic acid with a polyhydric alcohol. Polybasic acids are compounds having two or more carboxy groups per molecule (their anhydrides are also included). Polyhydric alcohols are compounds having two or more hydroxy groups per molecule. Such polyester resins can be modified with a monobasic acid, higher fatty acid, oil component, etc.

Such polyester resins may contain hydroxy groups. Hydroxy groups can be introduced by using a trivalent or higher alcohol in combination with a divalent alcohol. The polyester resins may have carboxy groups as well as hydroxy groups.

It is usually suitable that the polyester resins have a weight average molecular weight of about 1,000 to about 100,000, and preferably about 1,500 to about 70,000.

Preferable polyurethane resins for use as modifier resins are those obtained by reacting a polyhydroxy compound, a polyisocyanate compound and a compound having one active hydrogen atom per molecule. It is usually suitable that the polyurethane resins have a number average molecular weight of about 400 to about 10,000, and preferably about 1,000 to about 4,000.

It is preferable that the polyhydroxy compound have at least two alcoholic hydroxy groups per molecule; a number average molecular weight of about 50 to about 8,000, and particularly about 50 to about 6,000; and a hydroxy equivalent of about 25 to about 4,000, and particularly about 25 to about 3,000. Examples of such compounds include polyhydric alcohols; various polyester polyols and polyether polyols conventionally used for producing polyurethane resins; mixtures thereof; etc.

Polyisocyanate compounds are compounds having two or more, and preferably two or three, isocyanate groups per molecule. Examples of such compounds include aliphatic polyisocyanate compounds, alicyclic polyisocyanate compounds, aromatic polyisocyanate compounds, and other compounds conventionally used for producing polyurethane resins.

The compound having one active hydrogen atom per molecule is used for blocking isocyanate groups in the polyisocyanate compounds. Examples thereof include methanol, ethanol, diethylene glycol monobutyl ether and other monohydric alcohols; acetic acid, propionic acid and other monocarboxylic acids; ethyl mercaptan and other monothiols; diethylenetriamine, monoethanolamine and other primary amines; diethylamine and other secondary amines; methyl ethyl ketoxime and other oximes; etc.

When the primer coating composition of the present invention is aqueous, a hydrophilic polyurethane resin that dissolves or disperses in water is preferable as a polyurethane resin for use as a modifier resin.

Hydrophilic polyurethane resins can be obtained, for example, by extending and emulsifying, after or while being neutralized, a urethane prepolymer obtained by reacting, by a one-shot or multistage process, an aliphatic and/or alicyclic diisocyanate, diol with a number average molecular weight of about 500 to about 5,000, a low-molecular-weight polyhydroxyl compound and a dimethylolalkanoic acid. A particularly preferable hydrophilic polyurethane resin is an aqueous dispersion of a self-emulsifiable urethane resin with a mean particle diameter of about 0.001 to about 1 μm, obtained by distilling off some or all of the organic solvent used in the production process.

Commercial products of polyurethane resins can be used, including, for example, "Takelac W610" (tradename of Takeda Pharmaceutical Co., Ltd.), "Neorez R960" (tradename of Zeneca Resins Ltd.), "Sanprene UX-5100A" (tradename of Sanyo Chemical Industries, Ltd.), etc.

Crosslinking Agent (b)

The white conductive primer coating composition of the present invention contains a crosslinking agent together with the above resin component to improve the film performance characteristics, such as water resistance, and is used as a thermosetting coating composition.

Usable crosslinking agents include polyisocyanate compounds with unreacted isocyanate groups; blocked polyisocyanate compounds obtained by blocking isocyanate groups of a polyisocyanate compound with a blocking agent; melamine resins; epoxy resins; carbodiimide resins; oxazoline compounds; etc.

Examples of polyisocyanate compounds with unreacted isocyanate groups include tolylene diisocyanate (TDI), 4,4'-diphenylmethane diisocyanate (MDI), xylylene diisocyanate (XDI), metaxylylene diisocyanate (MXDI) and other aromatic diisocyanates; hexamethylene diisocyanate (HDI) and other aliphatic diisocyanates; isophorone diisocyanate (IPDI), hydrogenated MDI and other alicyclic diisocyanates; such diisocyanate compounds in a fixed and less toxic form; biurets, uretdiones, isocyanurates and adducts of such diisocyanate compounds; relatively low-molecular-weight urethane prepolymers; and other polyisocyanate compounds.

When the primer coating composition of the present invention is aqueous, it is preferable to use a polyisocyanate compound as hydrophilized. Polyisocyanate compounds can be hydrophilized, for example, by introducing at least one hydrophilic group into the compounds, which are then neutralized with a neutralizing agent. Examples of usable hydrophilic groups include carboxy groups, sulfonic acid groups, tertiary amino groups and the like, and examples of usable neutralizing agents include dimethylol propionic acid and like hydroxycarboxylic acids, ammonia, tertiary amine and the like. A surfactant may also be mixed with polyisocyanate compounds for emulsification, to prepare so-called self-emulsifiable polyisocyanate compounds.

Commercial products of hydrophilic polyisocyanate compounds are usable, including, for example, "Bayhydur 3100" (tradename of Sumika Bayer Urethane Co., Ltd., a hydrophilized isocyanurate of hexamethylene diisocyanate) and the like.

Blocked polyisocyanate compounds can be obtained by blocking isocyanate groups of a polyisocyanate compound with a blocking agent.

Usable blocking agents include ε-caprolactam, γ-butyrolactam and other lactam compounds; methyl ethyl ketoxime, cyclohexanone oxime and other oxime compounds; phenol, para-t-butylphenol, cresol and other phenol compounds; n-butanol, 2-ethylhexanol and other aliphatic alcohols; phenylcarbinol, methylphenylcarbinol and other aromatic alkyl alcohols; ethylene glycol monobutyl ether and other ether alcohol compounds; etc.

Blocked polyisocyanate compounds may be obtained by blocking a polyisocyanate compound with a blocking agent and then dispersing the blocked product in water. It is preferable to use a suitable emulsifier and/or protective colloid agent to disperse the blocked product, since such a blocked product is usually hydrophobic.

Examples of melamine resins include methylolated melamine resins obtained by reacting melamine with formaldehyde; partially or fully etherified melamine resins obtained by reacting a methylolated melamine resin with a $C_{1-10}$ monohydric alcohol; etc. Such melamine resins may contain imino groups. The melamine resins may be hydrophobic or hydrophilic. Especially suitable are hydrophilic, methyl-etherified melamine resins with a low degree of condensation and a number molecular weight no more than about 3,000, and particularly about 300 to about 1,500. Commercial products of such hydrophilic melamine resins are usable, including, for example, "Cymel 303", "Cymel 325" (tradenames of Japan Cytec Industries, Inc.), etc.

Epoxy resins have two or more epoxy groups per molecule, and are effective for crosslinking and curing carboxy-containing resins such as chlorinated polyolefins, acrylic resins, polyester resins, polyurethane resins, etc.

Examples of epoxy resins include copolymers of epoxy-containing polymerizable monomers and polymerizable vinyl monomers. Examples of epoxy-containing polymerizable monomers include glycidyl acrylate, glycidyl methacrylate, methyl glycidyl acrylate, methyl glycidyl methacrylate, etc. Polymerizable vinyl monomers are those other than epoxy-containing polymerizable monomers, and include, for example, alkyl (meth)acrylates, acrylonitrile, styrene, vinyl acetate, vinyl chloride, etc. The copolymerization reaction of such monomers can be performed by a known process, and it is preferable that the obtained polymer have an epoxy equivalent of about 200 to about 2,800, and especially about 300 to about 700, and a number average molecular weight of about 3,000 to about 100,000, and especially about 4,000 to about 50,000.

Also usable as the crosslinking agent are epoxy resins such as glycidyl-etherified bisphenols, hydrogenated products thereof, glycidyl-etherified aliphatic polyhydric alcohols, glycidyl ester-type epoxy resins, alicyclic epoxy resins, etc. Such epoxy resins preferably have a molecular weight of about 250 to about 20,000, and especially about 300 to about 5,000.

Commercial products of carbodiimide resins can be used, including, for example, "Carbodilite E-01", "Carbodilite E-02" (tradenames of Nisshinbo Industries, Inc.), etc.

Oxazoline compounds are hydrophilic compounds effective for crosslinking and curing chlorinated polyolefins, acrylic resins, polyester resins, polyurethane resins, and like resins, all having carboxy groups. Commercial products of such hydrophilic oxazoline compounds can be used, including, for example, "Epocros WS-500" (tradename of Nippon Shokubai Co., Ltd.) and the like.

White Conductive Titanium Dioxide Powder (c)

The white conductive titanium dioxide powder (c) is used as a conductive filler in the conductive primer coating composition of the present invention. The white conductive powder (c) comprises titanium dioxide particles having on their surfaces a conductive layer comprising tin oxide and phosphorus, and does not contain more than a specific amount of metallic elements with valencies of 4 or less as impurities. The conductive layer of the white conductive powder (c) contains no antimony.

The conductive layer comprising tin oxide and phosphorus is formed from tin oxide doped with phosphorus. Phosphorus-doped tin oxide is a solid solution formed by substitution of some of the tetravalent tin ions of tin oxide with pentavalent phosphorus ions.

The content of impurities in the white conductive titanium dioxide powder (c) is the total content of impurities in the titanium dioxide particles and impurities in the conductive layer on the particle surfaces. Impurities contained in the titanium dioxide particles are spread throughout the conductive layer, and together with impurities contained in the conductive layer, lower the conductivity. Thus, as low an impurity content as possible is desirable.

In the present invention, the value (A) obtained by the following formula (1) based on tin of the tin oxide in the conductive layer is used as an index of the impurity content.

$$(A) = (M_1) \times (4-n_1) + (M_2) \times (4-n_2) + (M_3) \times (4-n_3) + (M_4) \times (4-n_4) + \ldots + (M_X) \times (4-n_X) \quad \text{(Formula 1)}$$

wherein $M_1, M_2, M_3, M_4, \ldots M_X$ are the atomic ratios of metallic elements with valencies of 4 or less, such as sodium, potassium, calcium, magnesium, zinc, aluminum, iron, etc., to Sn of the tin oxide in the white conductive titanium dioxide powder.

In the present invention, metallic elements include, as well as main-group metal elements such as sodium, potassium, calcium, magnesium, zinc, aluminum, etc. and transition metal elements such as iron and the like, metalloid elements such as boron, silicon, germanium, arsenic, antimony, selenium, tellurium, etc. Hereinafter, elements other than such metallic elements are sometimes referred to as non-metallic elements. Further, "atomic ratio" as used herein is the ratio of the number of one type of metal atoms relative to the number of another type of metal atoms.

$M_1, M_2, M_3, M_4, \ldots M_X$ correspond in number to the number of metallic elements with valencies of 4 or less contained as impurities in the white conductive titanium dioxide powder, and X in $M_X$ may be a natural number 1 or greater.

When the white conductive titanium dioxide powder contains no metallic elements with valencies of 4 or less, $M_X$ is 0. The metallic elements with valencies of 4 or less do not include metallic elements in organometallic compounds, such as coupling agents described below, used for treating the white conductive titanium dioxide powder after baking $n_1, n_2, n_3, n_4, \ldots n_X$ are the valencies of metallic elements having atomic ratios of $M_1, M_2, M_3, M_4, \ldots M_X$, respectively, and are each more than 0 and not more than 4; and X in $n_X$ is the same numerical value as X in $M_X$, and may be a natural number 1 or greater.

For example, sodium, potassium, etc. have a valency of 1; calcium, magnesium, zinc, etc. have a valency of 2; and aluminum and the like have a valency of 3.

Iron has a valency of 2 or 3; silicon and zirconium have valencies of 2 or 4; and niobium has a valency from 2 to 5. In the case of metallic elements that may have different valencies, the valency states of such elements in the conductive powder (c) are analyzed by XPS (X-ray photoelectron spectroscopy), ESR (electron spin resonance) or like method. Metallic elements with valencies greater than 0 and less than 4 are considered as impurities that inhibit the conductivity; metallic elements with a valency of 4 are considered as impurities that do not affect the conductivity; and metallic elements with valencies greater than 4 are not considered as impurities. In particular, metallic elements with valencies greater than 0 but not greater than 3 are impurities that greatly inhibit the conductivity.

Formula (1) shows the total content (A) of the impurities, which are metallic elements with valencies of 4 or less, in the white conductive powder (c). The total impurity content is calculated to indicate the total influence of the impurities on the conductivity.

Specifically, the influence of each impurity metallic element on the conductivity can be calculated by multiplying the content of the metallic element by the remainder of subtracting the valency n of the metallic element from the valency 4 of tin of the tin oxide. The content of the metallic element is expressed as its atomic ratio to Sn of the tin oxide.

The total influence of the impurities on the conductivity is indicated as a total impurity content (A). Accordingly, the total impurity content (A) is expressed as $\Sigma(M_X) \times (4-n_X)$.

It is essential that the total impurity content (A) be no more than 0.1, preferably no more than 0.07, more preferably no more than 0.06, even more preferably no more than 0.02, and most preferably no more than 0.001.

When the total content of metallic elements with valencies of 4 or less contained as impurities is not more than the above values, a conductive filler with desired conductivity can be obtained, whereas when the total content of such metallic elements is greater than the above values, it is difficult to achieve desired conductivity.

Quantitative analyses of tin, phosphorus, titanium, and other metallic elements contained as impurities can be easily carried out by fluorescent X-ray spectroscopy. The valencies of metallic elements can be determined by XPS (X-ray photoelectron spectroscopy), ESR (electron spin resonance), etc.

The conductive layer can be formed on the surfaces of titanium dioxide particles by the method described below, wherein a tin compound and phosphorus compound are added to an aqueous suspension of a titanium dioxide powder to cause the compounds to adhere to the titanium dioxide particles, followed by baking. The conductive layer formed comprises tin oxide doped with phosphorus. The conductive layer contains substantially no antimony.

The amount of tin oxide in the conductive layer can be suitably selected, and is preferably 0.015 to 0.3 g, more preferably 0.03 to 0.3 g, and even more preferably 0.05 to 0.2 g, on a $SnO_2$ basis per square meter of surface area of the titanium dioxide. Using tin oxide within the above ranges usually achieves a continuous layer with good conductivity. Using tin oxide in an amount excessively smaller than the above ranges is likely to make it difficult to form a continuous conductive layer and to obtain desired conductivity. When tin oxide is used in an amount excessively greater than the above ranges, excessive tin oxide deposits in places other than the titanium dioxide surfaces, thereby forming particle aggregates. Thus, use of such an amount of tin oxide is uneconomical and is likely to reduce the whiteness of the conductive powder.

The amount of phosphorus in the conductive layer can be suitably selected. It is usually preferable that the proportion of phosphorus to tin oxide is 0.10 to 0.50 in terms of the P/Sn atomic ratio. Using phosphorus in such a proportion achieves good conductivity. When phosphorus is used in a proportion excessively smaller or greater than the above proportions, the conductivity is likely to be low. The proportion of phosphorus is more preferably 0.13 to 0.40, and even more preferably 0.15 to 0.30, in terms of the P/Sn atomic ratio.

The conductive layer comprising tin oxide and phosphorus preferably contains as little as possible of metallic elements with valencies of 4 or less, such as sodium, potassium, calcium, magnesium, zinc, aluminum, iron, etc.

Whether a continuous conductive layer has been formed or not can be confirmed by observation of a transmission electron microscopic photograph. Further, the specific surface area of the conductive layer calculated by the following formula (3) can be used as an index of the state of the conductive layer formed. In formula (3), the content of the conductive layer-forming components is the total content of tin oxide (on a $SnO_2$ basis) and phosphorus (on a $P_2O_5$ basis).

Specific surface area ($m^2/g$)=(specific surface area of conductive powder ($c$))/(content of conductive layer-forming components per gram of conductive powder ($c$))    Formula (3)

Usually, a conductive layer with a specific surface area not larger than about 70 $m^2/g$ is judged as being continuous.

The specific surface areas of the titanium dioxide and white conductive titanium dioxide powder (c) can be calculated by the BET method.

In the white conductive titanium dioxide powder (c), it is preferable that the titanium dioxide on which the conductive layer comprising tin oxide and phosphorus is formed contain as little as possible of metallic elements with valencies of 4 or less, such as sodium, potassium, calcium, magnesium, zinc, aluminum, iron, etc. Specifically, it is preferable that the content (B) of metallic elements with valencies of 4 or less contained as impurities in the titanium dioxide be no more than 0.02, the content (B) being calculated by the following formula (2).

$(B)=(M'_1)\times(4-n'_1)+(M'_2)\times(4-n'_2)+(M'_3)\times(4-n'_3)+(M'_4)\times(4-n'_4)+\ldots+(M'_Y)\times(4-n'_Y)$    Formula (2)

In formula (2), $M'_1$, $M'_2$, $M'_3$, $M'_4$, ... $M'_Y$ are the atomic ratios of metallic elements with valencies of 4 or less, such as sodium, potassium, calcium, magnesium, zinc aluminum, iron, etc., to Ti of the titanium dioxide, and correspond in number to the number of metallic elements with valencies of 4 or less contained as impurities in the titanium dioxide; and Y in $M'_Y$ may be a natural number 1 or greater.

When the titanium dioxide contains no metallic elements with valencies of 4 or less, $M'_Y$ is 0.

$n'_1$, $n'_2$, $n'_3$, $n'_4$, ... $n'_Y$ are the valencies of metallic elements having atomic ratios of $M'_1$, $M'_2$, $M'_3$, $M'_4$, $M'_Y$, respectively, and are each a number greater than 0 but not greater than 4. Y in $n'_Y$ is the same numerical value as Y in $M'_Y$, and is a natural number 1 or greater.

For example, sodium, potassium, etc. have a valency of 1; calcium, magnesium, zinc, etc. have a valency of 2; and aluminum and the like have a valency of 3.

Iron has a valency of 2 or 3; silicon and zirconium have valencies of 2 or 4; and niobium has a valency of 2 to 5. In the case of metallic elements that may have different valencies, the valency states of such elements in the titanium dioxide are analyzed by XPS (X-ray photoelectron spectroscopy), ESR (electron spin resonance) or like method. Metallic elements with valencies greater than 0 and less than 4 are considered as impurities that inhibit the conductivity; metallic elements with a valency of 4 are considered as impurities that do not affect the conductivity; and metallic elements with valencies greater than 4 are not considered as impurities. In particular, metallic elements with valencies greater than 0 but not greater than 3 are impurities that greatly inhibit the conductivity.

Formula (2) shows the total content (B) of metallic elements with valencies of 4 or less contained as impurities in the titanium dioxide. The total impurity content is calculated to indicate the total influence of the impurities on the conductivity.

Specifically, the influence of each impurity metallic element on the conductivity can be calculated by multiplying the content of the metallic element by the remainder of subtracting the valency n of the metallic element from the valency 4 of the tin of the tin oxide. The content of the metallic element is expressed as its atomic ratio to Ti of the titanium oxide.

The total influence of the impurities on the conductivity is indicated as a total impurity content (B). Accordingly, the total impurity content (B) is expressed as $\Sigma(M'_Y)\times(4-n'_Y)$.

The total impurity content (B) is preferably no more than 0.02, more preferably no more than 0.015, and even more preferably no more than 0.006. When the total content of metallic elements with valencies of 4 or less as impurities in the titanium dioxide is no more than the above values, desired conductivity can be obtained, whereas when the total content of such metallic elements is excessively greater than the above values, it is difficult to achieve desired conductivity.

Metallic elements with valencies greater than 4 reduce the mobility of conduction electrons produced when tin oxide is doped with phosphorus, and therefore the titanium dioxide preferably contains as little as possible of compounds of metallic elements with valencies greater than 4, such as niobium and the like. Further, the titanium dioxide preferably contains as little as possible of compounds of nonmetallic elements (other than oxygen), such as phosphorus, sulfur, etc.

More specifically, it is suitable to use high-quality titanium dioxide in which the total content of impurities including metallic elements with valencies of 4 or less, metallic elements with valencies greater than 4, and nonmetallic elements (other than oxygen) such as phosphorus, sulfur, etc., is, on an anhydrous oxide basis, no more than 1.5 wt. %, preferably no more than 1.0 wt. %, more preferably no more than 0.5 wt. %, and even more preferably no more than 0.1 wt. %; that is, the $TiO_2$ purity is preferably not less than 98.5 wt. %, more preferably not less than 99.0 wt. %, even more preferably not less than 99.5 wt. %, and still more preferably not less than 99.9 wt. %.

The shape and size of the titanium dioxide particles in the white conductive titanium dioxide powder (c) can be suitably selected according to the situation of use of the conductive filler. Examples of particle shapes include grains, approximate spheres, spheres, needles, fibers, columns, rods, spindles, plates, and like shapes. Among these, grains, approximate spheres and spheres are preferable since plastic products coated with a primer coating composition prepared using particles with such shapes have low toxicity to the human body when being recycled. Particles in a shape having an axial ratio, such as needles, fibers, columns, rods, spindles, etc., are preferable from the viewpoint of ease of improving the efficiency of the conductivity of the primer coating composition.

With respect to the particle size, particles in the shape of grains, approximate spheres or spheres preferably have a mean particle diameter of about 0.01 to about 3 µm, and more preferably about 0.03 to about 0.3 µm. Among particles in a shape having an aspect ratio (ratio of the length to the diameter), such as needles, fibers, columns, rods, spindles, etc., especially suitable are fine particulate titanium dioxide in the shape of spindles having a length of about 0.05 to about 0.3 µm and an aspect ratio not less than about 3, and preferably not less than 10; and particulate titanium dioxide in the shape of needles, rods or the like having a length of about 1 to about 10 μm and an aspect ratio of not less than about 3, and preferably not less than 10. The shape and size of the titanium dioxide particles can be measured by observation of an electron micrograph.

The preferable specific surface area of the titanium dioxide varies depending on the shape and size of the particles. Particles in the shape of grains, approximate spheres or spheres preferably have a specific surface area of about 0.5 to about 160 $m^2/g$, and more preferably about 4 to about 60 $m^2/g$. Particles in the shape of needles, fibers, columns or rods preferably have a specific surface area of about 0.3 to about 20 $m^2/g$, and more preferably about 1 to about 15 $m^2/g$. Particles in the shape of spindles preferably have a specific surface area of about 10 to about 250 $m^2/g$, and more preferably about 30 to about 200 $m^2/g$.

The crystal system of the titanium dioxide used in the white conductive titanium dioxide powder (c) may be rutile, anatase, brookite or amorphous, among which rutile, which is the same crystal system as the tin oxide used as a main ingredient of the conductive layer, is preferable, since use of rutile titanium dioxide makes it easy to achieve conductivity.

In production of the white conductive titanium dioxide powder (c), it is essential that the content (B) of metallic elements with valencies of 4 or less contained as impurities in the titanium dioxide be no more than 0.02, preferably no more than 0.015, and more preferably no more than 0.006, the content (B) being calculated by the above formula (2).

Preferable examples of titanium dioxide include high-quality titanium dioxide in which the total content of impurities including metallic elements with valencies of 4 or less, metallic elements with valencies greater than 4, and nonmetallic elements (other than oxygen), such as phosphorus, sulfur, etc., is, on an anhydrous oxide basis, no more than 1.5 wt. %, preferably no more than 1.0 wt. %, more preferably no more than 0.5 wt. %, and even more preferably no more than 0.1 wt. %. In other words, such high-quality titanium dioxide has a $TiO_2$ purity of at least 98.5 wt. %, preferably at least 99.0 wt. %, more preferably at least 99.5 wt. %, and even more preferably at least 99.9 wt. %.

Such titanium dioxide can be produced by a conventional titanium dioxide production process, such as a chloride process, sulfate process, flame hydrolysis process, wet hydrolysis process, neutralization process, sol-gel process or the like, which is selected and performed so as to obtain titanium dioxide that does not contain more than a specific amount of metallic elements with valencies of 4 or less, such as sodium, potassium, calcium, magnesium, zinc, aluminum, iron, etc., or does not contain more than a specific total amount of impurities.

It is possible to reduce the amount of metallic elements with valencies of 4 or less or the total amount of impurities to the above ranges, by, after producing titanium dioxide containing more than the specific amount of impurities, treating the impurity-containing titanium dioxide with an acid or alkali, or treating the titanium dioxide with an acid and then with an alkali, or treating the titanium dioxide with an alkali and then with an acid. Suitable acids for the treatment include hydrochloric acid, sulfuric acid, nitric acid, hydrofluoric acid and like inorganic acids, which are usually used in the form of a 1 to 50 wt. % aqueous solution. Usable alkalis include sodium hydroxide, potassium hydroxide, etc., in the form of a 10 to 50 wt. % aqueous solution. An acid treatment or alkaline treatment can be carried out by adding titanium dioxide to an acid or alkali solution, followed by stirring for 1 to 3 hours, optionally with heating to 50 to 90° C. A single treatment with an acid or alkali can yield titanium dioxide of a desired quality. A combination of acid treatment with alkali treatment is likely to yield titanium dioxide of higher quality.

A tin compound and phosphorus compound are added to an aqueous suspension of such titanium dioxide, to thereby cause the tin compound and phosphorus compound to adhere to the surfaces of the titanium dioxide particles.

Various tin compounds can be used, including stannic chloride, stannous chloride, potassium stannate, sodium stannate, stannous fluoride, stannous oxalate, etc. Usable phosphorus compounds include, for example, phosphorus trichloride, orthophosphoric acid, sodium hydrogenphosphate, trisodium phosphate, ammonium hydrogenphosphate, phosphorous acid, sodium dihydrogenphosphite, trisodium phosphite, phosphorus pentachloride, etc. One or more tin compounds, and one or more phosphorus compounds can be used.

Such a tin compound and phosphorus compound can be adhered by various processes. In the present invention, a process is preferable in which an aqueous acid solution containing a tin compound and phosphorus compound, and an aqueous alkali solution are separately prepared and added to the aqueous titanium dioxide suspension while maintaining the suspension at pH 2 to 6 or pH 8 to 12.

When the pH of the aqueous suspension is within the above range, good conductivity can be usually obtained. pHs outside the above range make it difficult for the tin compound and phosphorus compound to adhere to the surfaces of the titanium dioxide particles, thereby making it difficult to obtain desired conductivity, and increasing the content of compounds of metallic elements with valencies of 4 or less as impurities. An aqueous titanium dioxide suspension with a pH of 8 to 12 is preferable since it allow more uniform adhesion of the tin compound and phosphorus compound. pHs of 9 to 10 are especially preferable. Acidic pHs of 2 to 3 are also preferable.

The titanium dioxide concentration of the aqueous suspension can be suitably selected, and is preferably about 25 to about 300 g/l, and more preferably about 50 to about 200 g/l. The temperature of the aqueous suspension is usually about room temperature to about 95° C., and preferably about 60 to about 90° C. Room temperature usually indicates about 10 to about 30° C.

The tin compound and phosphorus compound are dissolved in an inorganic acid, such as hydrochloric acid, sulfuric acid, nitric acid, hydrofluoric acid or the like, or an organic acid, such as formic acid, acetic acid, oxalic acid, citric acid or the like, to prepare an aqueous acid solution. The tin compound is added in such an amount that the titanium oxide is covered with a specific amount of tin oxide, and is, on a $SnO_2$ basis per square meter of surface area of the titanium dioxide particles, preferably 0.015 to 0.3 g, more preferably 0.03 to 0.3 g, and even more preferably 0.05 to 0.2 g. The phosphorus compound is added in such an amount that the tin oxide is doped with a specific amount of the phosphorus compound, and is, in terms of the P/Sn atomic ratio, preferably 0.10 to 0.50, more preferably 0.13 to 0.40, and even more preferably 0.15 to 0.30. The concentrations of the tin compound and phosphorus compound in the aqueous acid solution can be suitably selected.

An aqueous alkali solution is used to neutralize the aqueous acid solution of the tin compound and phosphorus compound and thereby attain a pH of 2 to 6 or 8 to 12. The aqueous alkali solution may be at least one member selected from aqueous solutions of alkali metal hydroxides and carbonates such as sodium hydroxide, potassium hydroxide, sodium carbonate, potassium carbonate, etc., and aqueous solutions of basic compounds such as ammonia, ammonium hydroxide, ammonium carbonate, ammonium hydrogencarbonate, hydrazine, hydroxyamine, etc.

The product obtained by adhering the tin compound and phosphorus compound to the surfaces of titanium dioxide particles is separated and baked at about 600 to about 925° C. The separation is usually performed by filtration, optionally followed by washing. When an alkali metal hydroxide or carbonate is used as a neutralizing agent, it is preferable to thoroughly wash the product so that no alkali metals remain, since insufficient washing may reduce the conductivity because of alkali metals adsorbed and remaining on the product.

The degree of washing of the product can be controlled by observing the specific conductivity of the filtrate. The lower the specific conductivity (unit: μS/cm), the higher the degree of washing. The product is preferably washed until the specific conductivity of the filtrate becomes about 125 μS/cm or lower, and more preferably about 50 μS/cm or lower.

The separated product was dried if necessary, and then baked at about 600 to about 925° C., preferably 750 to 925° C., more preferably 800 to 900° C., and even more preferably 825 to 875° C. The baking can be performed in an oxidizing atmosphere, reducing atmosphere or inert gas atmosphere. For example, baking in air is advantageous since it can be performed at low cost. Further, it is preferable to carry out baking in a low oxygen concentration atmosphere in which air is diluted with an inert gas, such as nitrogen, helium, argon or the like; an inert gas atmosphere, such as nitrogen, helium, argon or the like; a reducing atmosphere, such as hydrogen, ammonia, carbon monoxide or the like; etc, so that a good conductive layer can be obtained. To achieve low cost and form a good conductive layer, the oxygen concentration of the low oxygen concentration atmosphere is preferably about 5 to about 15 vol. %, and more preferably about 7 to about 10 vol. %. The baking time varies according to the type of apparatus used, amount to be treated, etc., and is usually about 1 to about 8 hours, and is preferably about 1 to 6 hours.

After the baking, the baked product is cooled to a sufficiently low temperature to be removed. The cooling method may be rapid cooling after baking, or slow cooling in which the temperature of the baked product is slowly cooled to room temperature over 2 hours or more. When a product baked in a low oxygen concentration atmosphere, inert gas atmosphere or reducing atmosphere is cooled in the same atmosphere, substantially the same conductivity can be obtained by rapid cooling or slow cooling. When a product baked in air is cooled in the same atmosphere, rapid cooling is more likely to result in a good conductive layer than slow cooling. In view of the above, rapid cooling can form a good conductive layer regardless of the baking atmosphere, and thus is preferable.

Baking at a high temperature of 600° C. or higher, preferably 750° C. or higher, and more preferably 800° C. or higher, as mentioned above, substantially does not cause coarsening or sintering of the baked product particles. Further, a good conductive layer can be easily formed by suitably selecting the baking atmosphere and cooling method.

After cooling and removing the baked product from the baking apparatus, the product may be pulverized by a standard process to obtain a powder. The pulverized product may be subjected to pH adjustment, impurity removal, etc., as required. Further, if necessary, the surface of the pulverized product may be treated with organic matter by a wet or dry process.

Organic matter may be adhered to the surface of white conductive titanium dioxide powder (c) thus obtained, to improve the dispersibility in resins, stability of conductivity over time, etc. Examples of organic matter include organo-metallic compounds, such as silicon compounds, titanium compounds, aluminum compounds, zirconium compounds, zirconium-aluminum compounds and the like, polyols, etc. Such kinds of organic matter may be used singly or in combination. The amount of organic matter is usually about 0.0001 to about 0.4 g, and preferably about 0.0006 to about 0.2 g per square meter of surface area of the white conductive titanium dioxide powder (c).

Examples of silicon organometallic compounds include aminopropyltriethoxysilane, N-β(aminoethyl)γ-aminopropyltriethoxysilane, N-phenyl-γ-aminopropyltrimethoxysilane, vinyltrimethoxysilane, vinyltriethoxysilane, vinyltrichlorosilane, γ-glycidoxypropyltrimethoxysilane, methacryloxypropyltrimethoxysilane and other silane coupling agents; n-butyltriethoxysilane, isobutyltrimethoxysilane, n-hexyltrimethoxysilane, n-hexyltriethoxysilane, n-octyltrimethoxysilane, n-octyltriethoxysilane, n-decyltrimethoxysilane, n-octadecyltrimethoxysilane, n-octadecylmethyldimethoxysilane and other alkylsilanes; phenyltriethoxysilane and other phenylsilanes; trifluoropropyltrimethoxysilane and other fluorosilanes; methyl hydrogen polysiloxane, dimethylpolysiloxane, methylphenylpolysiloxane, dimethylpolysiloxanediol, alkyl-modified silicone oil, alkyl aralkyl-modified silicone oil, amino-modified silicone oil, silicone oil with both ends amino-modified, epoxy-modified silicone oil, silicone oil with both ends epoxy-modified, fluoride-modified silicone oil and other polysiloxanes; and the like.

Examples of titanium organometallic compounds include isopropyltriisostearoyl titanate, isopropyltris(dioctylpyrophosphate) titanate, tetra(2,2-diallyloxymethyl-1-butyl)bis (ditridecyl)phosphite titanate, bis(dioctylpyrophosphate) oxyacetate titanate, bis(dioctylpyrophosphate)ethylene titanate and other titanate coupling agents, and the like.

Examples of aluminum organometallic compounds include acetoalkoxyaluminum diisopropylates and other aluminate coupling agents, and the like.

Examples of zirconium organometallic compounds include zirconium tributoxy acetylacetonate, zirconium tributoxy stearate, etc.

Examples of polyols include trimethylolethane, trimethylolpropane, pentaerythritol, etc.

White Pigment (d)

The white conductive primer coating composition may further contain (d) a white pigment to improve the whiteness of the coating layer to be obtained.

Usable as the white pigment (d) is, for example, titanium dioxide, white lead, zinc white, zinc sulfide, lithopone, etc. Examples of titanium dioxide include rutile titanium dioxide, anatase titanium dioxide, etc. Titanium dioxide is preferable from the viewpoint of chemical resistance and whiteness. More preferable is rutile titanium dioxide with a mean particle diameter of about 0.05 to about 2.0 μm, and especially about 0.1 to about 1.0 μm.

Examples of the particle shape of titanium dioxide for use as the white pigment (d) include, grains, approximate spheres, spheres, needles, fibers, columns, rods, spindles, plates, and like shapes. Titanium dioxide in the shape of grains, approximate spheres or spheres with high whiteness is especially preferable.

Formulation of White conductive primer coating composition

The white conductive primer coating composition of the present invention comprises (a) 100 parts by weight of the total of a chlorinated polyolefin resin with a chlorine content of 10 to 40 wt. %, and at least one modifier resin selected from the group consisting of acrylic resins, polyester resins and polyurethane resins; (b) about 5 to about 50 parts by weight of a crosslinking agent; and (c) about 10 to about 250 parts by weight of a white conductive titanium dioxide powder. The parts by weight are based on the weight of the solids.

The use of about 5 to about 50 parts by weight of the crosslinking agent (b) results in a coating composition with sufficient curability, and improves film performance characteristics, such as water resistance and the like.

The use of about 10 to about 250 parts by weight of the white conductive titanium dioxide powder (c) can impart sufficient conductivity to the coating layer of the primer coating composition, so that another coating composition can be electrostatically applied over the coating layer. Further, such an amount of the white conductive powder does not impair the storage stability of the coating composition, and achieves excellent brightness, finished appearance and other characteristics of the coating layer.

The proportion of the crosslinking agent (b) is preferably about 10 to about 45 parts by weight per 100 parts by weight of the total solids content of the resin component (a). The proportion of the white conductive titanium dioxide powder (c) is preferably about 50 to about 200 parts by weight per 100 parts by weight of the total solids content of the resin component (a).

As described above, the white conductive primer coating composition of the present invention may further contain a white pigment (d) to improve the whiteness of the coating layer. The proportion of the white pigment (d) is usually about 200 parts by weight or less, preferably about 20 to about 180 parts by weight, and more preferably about 30 to about 130 parts by weight, per 100 parts by weight of the total solids content of the resin component (a).

The white conductive primer coating composition of the present invention can be prepared by dissolving or dispersing the above-mentioned components in an organic solvent, water or a mixture thereof by a known method to adjust the solids content to about 15 to about 60 wt. %. The primer coating composition of the present invention may be an organic solvent-based or aqueous composition, and to achieve low VOC, is preferably an aqueous white conductive primer coating composition.

As an organic solvent, the organic solvent used for preparation of each component may be used, or another organic solvent may be added as required.

Organic solvents usable in the composition of the present invention include, for example, methyl ethyl ketone, methyl isobutyl ketone and other ketone solvents; ethyl acetate, butyl acetate and other ester solvents; ethylene glycol monobutyl ether and other ether solvents; isopropyl alcohol, n-butyl alcohol, isobutyl alcohol and other alcohol solvents; n-heptane, n-hexane and other aliphatic hydrocarbon solvents; toluene, xylene and other aromatic hydrocarbon solvents; other solvents such as N-methylpyrrolidone; etc.

Process for Applying White Conductive Primer Coating Composition

Various plastic substrates can be used as substrates to be coated with the white conductive primer coating composition of the present invention.

The material of the plastic substrate to be used is preferably, but not limited to, a polyolefin obtained by polymerizing at least one $C_{2-10}$ olefin, such as ethylene, propylene, butylene, hexene or the like. Polycarbonates, ABS resins, urethane resins, nylon and other materials are also usable. Such plastic substrates may be subjected to, as required, degreasing, water-washing and/or other treatments beforehand, by known methods.

Examples of usable plastic substrates include, but are not limited to, various plastic members for use in bumpers, spoilers, grilles, fenders and other automotive exterior panel parts, electrical home appliance exterior panel parts, etc.

The white conductive primer coating composition can be applied, usually after being adjusted to a viscosity of about 12 to about 18 seconds/Ford cup #4/20° C., to a plastic substrate surface by air spray coating, airless spray coating, dip coating or like coating method. The composition is usually applied to a thickness of about 5 to about 50 μm, (when cured), and preferably about 10 to about 45 μm (when cured).

The applied primer coating composition is allowed to stand at room temperature, or preheated, or cured by heating, to thereby obtain an uncured or cured coating layer that usually has a surface electrical resistance of less than $10^9$ Ω/sq. With a surface electrical resistance of less than $10^9$ Ω/sq., the coating layer can be electrostatically coated with other coating compositions, such as a colored coating composition and/or clear coating composition.

Known heating methods can be used for preheating or curing by heating the coating layer of the white conductive primer coating composition. Examples of usable methods include air blowing, infrared heating, far-infrared heating, induction heating, dielectric heating, etc. The plastic substrate may be heated as required.

The white primer coating composition of the present invention can form a coating layer with high whiteness, i.e., a lightness (L* value) of 80 or more according to the L*a*b* color system as defined in JIS Z 8729.

The lightness can be measured as follows. The coating composition is applied to a plastic substrate by spray coating to a thickness of about 20 μm (when cured), and cured by heating at about 80 to about 120° C. for about 20 to about 40 minutes, and the lightness (L* value) of the obtained coating layer is measured using a calorimeter. Commercial colorimeters can be used, including, for example, "Color Computer SM-7" (tradename of Suga Test Instruments Co., Ltd.).

Multilayer coating films with bright color tones can be formed on plastic substrate surfaces by the following multilayer coating film forming methods I and II using the white conductive primer coating composition of the present invention, which are a 3-coat 1-bake method and 3-coat 2-bake method, respectively.

Multilayer coating film forming method I is a 3-coat 1-bake method comprising the steps of:
(1) applying the white conductive primer coating composition of the present invention to a plastic substrate, usually to a thickness of about 5 to about 50 μm (when cured), and preferably about 10 to about 40 μm (when cured);
(2) electrostatically applying a colored base coating composition to the uncured coating layer of the primer coating composition, usually to a thickness of about 5 to about 30 μm (when cured), and preferably about 10 to 25 μm (when cured);
(3) electrostatically applying a clear coating composition to the uncured coating layer of the base coating composition, usually to a thickness of about 5 to about 50 μm (when cured), and preferably about 10 to about 40 μm (when cured); and then
(4) simultaneously curing by heating the three layers of the primer coating composition, colored base coating composition and clear coating composition.

In method I, the primer coating composition, colored coating composition and clear coating composition, after being applied, may be allowed to stand or preheated as required. When the applied composition is allowed to stand, it is usually allowed to stand at room temperature for about 1 to about 20 minutes. For preheating, the applied composition is usually heated at about 40 to about 120° C. for about 1 to about 20 minutes.

The three-layer coating comprising the primer coating composition, colored base coating composition and clear coating composition can usually be cured by heating at about 60 to about 140° C., for about 10 to about 60 minutes. The curing is preferably performed by heating at about 80 to about 120° C., for about 10 to about 40 minutes.

Multilayer coating film forming method II is a 3-coat 2-bake method comprising:
(1) applying the white conductive primer coating composition of the present invention to a plastic substrate, usually to a thickness of about 5 to about 50 μm (when cured), and preferably about 10 to about 40 μm (when cured), followed by curing by heating;
(2) electrostatically applying a colored base coating composition to the cured coating layer of the primer coating composition, usually to a thickness of about 5 to about 30 μm (when cured), and preferably about 10 to about 25 μm (when cured);
(3) electrostatically applying a clear coating composition to the uncured coating layer of the base coating composition, usually to a thickness of about 5 to about 50 μm (when cured), and preferably about 10 to about 40 μm (when cured); and then
(4) simultaneously curing by heating the two layers of the colored base coating composition and clear coating composition.

In method II, the primer coating composition is usually cured by heating at about 60 to about 140° C., for about 10 to about 60 minutes. The curing is preferably performed by heating at about 80 to about 120° C., for about 10 to about 40 minutes.

Each composition, after being applied, may be allowed to stand or preheated as required. When the applied composition is allowed to stand, it is usually allowed to stand at room temperature for about 1 to about 20 minutes. For preheating, the applied composition is usually heated at about 40 to about 120° C., for about 1 to about 20 minutes.

The two-layer coating consisting of the colored base coating composition and clear coating composition can be usually cured by heating at about 60 to about 140° C., for about 10 to about 60 minutes. The curing is preferably performed by heating at about 80 to about 120° C., for about 10 to about 40 minutes.

In methods I and II, the colored base coating composition may be a known colored base coating composition for topcoating. Preferably usable are, for example, coating compositions obtained by dissolving or dispersing in water and/or an organic solvent a base resin having crosslinkable functional groups; a crosslinking agent; and a coloring pigment.

Examples of crosslinkable functional groups of the base resin include carboxy, hydroxy and like groups. Examples of base resins include acrylic resins, polyester resins, alkyd resins, urethane resins, epoxy resins, etc. Examples of crosslinking agents include polyisocyanate compounds, blocked polyisocyanate compounds, melamine resins, urea resins, etc.

Such a colored base coating composition may contain a metallic pigment, mica pigment, extender pigment, dye and/or the like, as required. Among these, use of a metallic pigment gives a coating film with a dense, metallic appearance, and use of a mica pigment gives a coating film with a silky pearl tone.

In methods I and II, the clear coating composition may be a known clear coating composition for topcoating. Preferably usable are coating compositions obtained by dissolving or dispersing in water and/or an organic solvent a base resin having crosslinkable functional groups, and a crosslinking agent.

Examples of crosslinkable functional groups of the base resin include carboxy, hydroxy and like groups. Examples of base resins include acrylic resins, polyester resins, alkyd resins, urethane resins, epoxy resins, etc. Examples of crosslinking agents include polyisocyanate compounds, blocked polyisocyanate compounds, melamine resins, urea resins, etc.

Such a clear coating composition may contain, as required, a coloring pigment, metallic pigment, extender pigment, dye, UV absorber and/or the like in such an amount that does not impair the transparency.

EFFECTS OF THE INVENTION

The present invention accomplishes the following remarkable effects.

(1) In the coating composition of the present invention, the white conductive titanium dioxide powder (c) used as a conductive filler does not contain toxic antimony. Thus, the composition of the present invention causes no pollution.

(2) Since the titanium dioxide particles of the white conductive titanium dioxide powder (c) have a stable conductive layer on their surfaces, the white conductive primer coating composition of the present invention containing the powder (c) is capable of forming an uncured or cured coating layer having a surface electrical resistance less than $10^9$ Ω/sq. Accordingly, other coating compositions, such as a colored coating composition and/or clear coating composition for topcoating, can be applied on the primer coating layer by electrostatic coating, which exhibits an excellent deposition efficiency. Thus, the amount of coating material discharged to the environment can be greatly reduced.

Further, the coating composition of the present invention can be prepared as an aqueous composition. This can reduce the amount of organic solvent to be discharged to the environment.

(3) When the primer coating composition of the present invention is applied to a plastic substrate and heated, the obtained cured coating layer has high whiteness, i.e., a lightness (L* value) of 80 or more according to the L*a*b* color system defined in JIS Z 8729. Thus, the primer coating layer has little influence on the color properties, such as brightness, of the upper coating layers.

(4) The primer coating composition of the present invention, due to a specific resin component (a) and a crosslinking agent (b) contained therein, exhibits excellent film performance characteristics, such as adhesion to plastic substrates, water resistance, etc.

(5) The multilayer coating film forming method of the present invention can form a multilayer coating film with a lightness (N value) according to the Munsell color system of 8.0 or more, and even 8.3 or more, by a 3-coat 1-bake or 3-coat 2-bake process.

BEST MODE FOR CARRYING OUT THE INVENTION

The following Production Examples, Examples and Comparative Examples are provided to illustrate the present invention in further detail. In the following examples, parts and percentages are by weight.

PRODUCTION EXAMPLE 1

Production of White Conductive Titanium Dioxide Powder (c) A high-quality rutile titanium dioxide powder with a mean particle diameter of 0.25 μm produced by a chloride process was used as a starting material. The titanium dioxide contained, as an impurity metallic element with a valency of 4 or less, silicon (valency: 4) in an atomic ratio of 0.00027 relative to Ti of the titanium dioxide, but had a content (B) of 0 as calculated by formula (2). The titanium dioxide contained, as an impurity element other than oxygen and metallic elements with valencies of 4 or less, 0.02% of sulfur (valency: 6, a nonmetallic element) on a $SO_3$ basis, and had a $TiO_2$ purity of 99.96% and a specific surface area of 6.6 $m^2$/g as determined by the BET method.

One hundred grams of the high-quality rutile titanium dioxide powder was added to water to form a suspension at a concentration of 100 g/l. The suspension was adjusted to pH 2 to 3 with an aqueous solution of hydrochloric acid, and heated to 70° C. An aqueous solution of sodium hydroxide and a mixture of 173 g of a 50% aqueous solution of tin chloride ($SnCl_4$), 6.1 g of 85% phosphoric acid ($H_3PO_4$) and 75 ml of a 12 N hydrochloric acid solution were simultaneously added over 60 minutes in such a manner that the suspension was maintained at pH 2 to 3, to thereby form a covering layer of tin oxide hydrate containing phosphoric acid on the titanium dioxide particles. The suspension had a final pH of 2. Further, the suspension was stirred for 20 minutes for aging while being maintained at 70° C.

The covered titanium dioxide particles were collected by filtration, and washed until the filtrate had a specific electric conductivity of 50 μS/cm. The covered titanium dioxide particles were collected by drying at 120° C. overnight, placed in an electric furnace, baked in air at 850° C. for 1 hour, and then crushed in a pulverizer to obtain a white conductive titanium dioxide powder (conductive filler No. 1).

In conductive filler No. 1, the amount of tin oxide is 0.076 g on a $SnO_2$ basis per square meter of surface area of the titanium dioxide, and the proportion of phosphorus to tin oxide was 0.17 in terms of the P/Sn atomic ratio. The amount of metallic elements with valencies of 4 or less contained as impurities in conductive filler No. 1 was below the detection limit, i.e., the content (A) calculated by formula (1) was 0.

PRODUCTION EXAMPLE 2

Production of White Conductive Titanium Dioxide Powder (c)

The procedure of Production Example 1 was repeated except for using, in place of the high-quality rutile titanium dioxide powder, a rutile titanium dioxide powder with a mean particle diameter of 0.25 μm containing a small amount of alumina, to obtain a white conductive titanium dioxide powder (conductive filler No. 2).

The titanium dioxide used was produced by a chloride process, and contained aluminum (valency: 3) in an atomic ratio of 0.005 relative to Ti of the titanium dioxide. No other metallic elements with valencies of 4 or less were detected, and the content (B) calculated by formula (2) was 0.005. No elements other than oxygen and metallic elements with valencies of 4 or less were detected. The $TiO_2$ purity was 99.7%, and the specific surface area determined by the BET method was 6.8 $m^2$/g.

In conductive filler No. 2, the amount of tin oxide was 0.074 g on a $SnO_2$ basis per square meter of surface area of the titanium dioxide, and the proportion of phosphorus to tin oxide was 0.17 in terms of the P/Sn atomic ratio. Further, in this conductive filler, the atomic ratio of aluminum (valency: 3) to Sn was 0.019, and the content (A) calculated by formula (1) was 0.019.

PRODUCTION EXAMPLE 3

Production of White Conductive Titanium Dioxide Powder (c)

The procedure of Production Example 1 was repeated except for using, in place of the high-quality rutile titanium dioxide powder, a rutile titanium dioxide powder with a mean particle diameter of 0.25 μm containing a small amount of alumina, to obtain a white conductive titanium dioxide powder (conductive filler No. 3).

The titanium dioxide used was produced by a chloride process, and contained aluminum (valency: 3) in an atomic ratio of 0.015 relative to Ti of the titanium dioxide. No other metallic elements with valencies of 4 or less were detected, and the content (B) calculated by formula (2) was 0.015. The titanium dioxide contained, as an element other than oxygen and metallic elements with valencies of 4 or less, 0.1% of phosphorus (valency: 5, a nonmetallic element) on a $P_2O_5$ basis, and had a $TiO_2$ purity of 99.0% and a specific surface area of 7.1 $m^2$/g as determined by the BET method.

In conductive filler No. 3, the amount of tin oxide was 0.070 g on a $SnO_2$ basis per square meter of surface area of the titanium dioxide, and the proportion of phosphorus to tin dioxide was 0.17 in terms of the P/Sn atomic ratio. Further, in this conductive filler, the atomic ratio of aluminum (valency: 3) to Sn was 0.057, no other metallic elements with valencies of 4 or less were detected, and the content (A) calculated by formula (1) was 0.057.

PRODUCTION EXAMPLE 4

Production of White Conductive Titanium Dioxide Powder (c)

(1) A high-quality needlelike titanium oxide powder was prepared as follows.

Four parts of fine particulate hydrous titanium dioxide on a $TiO_2$ basis, 4 parts of sodium chloride and 1 parts of sodium hydrogenphosphate ($Na_2HPO_4.2H_2O$) were homogeneously mixed, placed in a crucible, and baked in an electric furnace at 825° C. for 3 hours. The baked product was placed in water, boiled for 1 hour, collected by filtration and washed to remove soluble salts. The needlelike titanium oxide thus obtained had a length of 3 to 5 μm and a diameter of 0.05 to 0.07 μm. Analysis revealed that the titanium oxide contained, as impurities, 3.8% of sodium on a $Na_2O$ basis and 4.4% of phosphorus on a $P_2O_5$ basis, and had a $TiO_2$ purity of 91.0%. The fine particulate hydrous titanium dioxide was fine particulate rutile titania obtained as follows: an aqueous solution of 200 g/l of titanium tetrachloride on a $TiO_2$ basis was neutralized, while being maintained at 30° C., with an aqueous solution of sodium hydroxide to precipitate colloidal amorphous titanium hydroxide, which was then aged at 70° C. for 5 hours and thereafter dried at 120° C.

The needlelike titanium oxide was added to water to form an aqueous suspension, and an aqueous solution of sodium hydroxide (200 g/l) was added to adjust the suspension to pH 13.0. The resulting mixture was heated to 90° C., stirred for 2 hours and subjected to alkaline treatment. The suspension was adjusted to pH 7.0 with an aqueous solution of hydrochloric acid (100 g/l), filtered, and washed until the filtrate had a specific electric conductivity of 50 μS/cm. Subsequently, the following acid treatment was carried out.

The filter cake obtained was added to water again to form a water suspension. The suspension was adjusted to pH 1.0 with an aqueous solution of hydrochloric acid (100 g/l), heated to 90° C., stirred for 2 hours, filtered, and washed until the filtrate had a specific electric conductivity of 50 μS/cm.

Analysis of the components of the needlelike titanium oxide thus treated revealed that the amount of metallic elements with valencies of 4 or less contained as impurities was below the detection limit, and that the content (B) calculated by formula (2) was 0. The needlelike titanium oxide contained, as an impurity element other than oxygen and metallic elements with valencies of 4 or less, 0.1% of phosphorus (valency: 5, a nonmetallic element) on a $P_2O_5$ basis, and had a $TiO_2$ purity of 99.9% and a specific surface area of 11.5 $m^2/g$ as determined by the BET method.

(2) The procedure of Production Example 1 was repeated except for using, in place of the high-quality rutile titanium dioxide powder, a high-quality needlelike titanium oxide powder obtained in (1) above, and using the 50% aqueous tin chloride ($SnCl_4$) solution in an amount of 307 g instead of 173 g and the 85% phosphoric acid ($H_3PO_4$) in an amount of 10.8 g instead of 6.1 g, to obtain a white conductive titanium dioxide powder (conductive filler No. 4).

In conductive filler No. 4, the amount of tin oxide was 0.077 g on a $SnO_2$ basis per square meter of surface area of the titanium dioxide, and the proportion of phosphorus to tin oxide was 0.17 in terms of the P/Sn atomic ratio. Further, in this conductive filler, no metallic elements with valencies of 4 or less were detected, and the content (A) calculated by formula (1) was 0.

PRODUCTION EXAMPLE 5

Production of Conductive Filler for Comparative Example

The procedure of Production Example 1 was repeated except for using a rutile titanium dioxide powder with a mean particle diameter of 0.25 μm for pigments in place of the high-quality rutile titanium dioxide powder, to obtain conductive filler No. 5.

The titanium dioxide used contained aluminum (valency: 3) and silicon (valency: 4) in atomic ratios of 0.034 and 0.0027, respectively, relative to Ti of the titanium dioxide. No other metallic elements with valencies of 4 or less were detected, and the content (B) calculated by formula (2) was 0.034. The titanium dioxide contained 0.1% on a $P_2O_5$ basis of phosphorus (valency: 5, a nonmetallic element) as an element other than oxygen and metallic elements with valencies of 4 or less, and had a $TiO_2$ purity of 97.6 % and a specific surface area of 12.4 $m^2/g$ as determined by the BET method.

In conductive filler No. 5, the amount of tin oxide was 0.040 g on a $SnO_2$ basis per square meter of surface area of the titanium dioxide, and the proportion of phosphorus to tin oxide was 0.17 in terms of the P/Sn atomic ratio. Further, in this conductive filler, the atomic ratios of aluminum (valency: 3) and silicon (valency: 4) to Sn were 0.12 and 0.0080, respectively; no other metallic elements with valencies of 4 or less were detected; and the content (A) calculated by formula (1) was 0.12.

PRODUCTION EXAMPLE 6

Production of Conductive Filler for Comparative Example

The procedure of Production Example 1 was repeated except using a rutile titanium dioxide powder containing zinc oxide in place of the high-quality rutile titanium dioxide powder, to obtain conductive filler No. 6.

The titanium dioxide used was produced by a sulfate process, and contained zinc (valency: 2), sodium (valency: 1), aluminum (valency: 3) and silicone (valency: 4), in atomic ratios of 0.007, 0.003, 0.003 and 0.0027, respectively, relative to Ti of the titanium dioxide. No other metallic elements with valencies of 4 or less were detected, and the content (B) calculated by formula (2) was 0.026. The titanium dioxide contained, as elements other than oxygen and metallic elements with valencies of 4 or less, 0.2% of phosphorus (valency: 5, a nonmetallic element) on a $P_2O_5$ basis and 0.2% of niobium (valency: 5) on a $Nb_2O_5$ basis, and had a $TiO_2$ purity of 98.4% and a specific surface area of 6.7 $m^2/g$ as determined by the BET method.

In conductive filler No. 6, the amount of tin oxide was 0.075 g on a $SnO_2$ basis per square meter of surface area of the titanium dioxide, and the proportion of phosphorus to tin oxide was 0.17 in terms of the P/Sn atomic ratio. In this conductive filler, the atomic ratios of zinc (valency: 2), sodium (valency: 1), aluminum (valency: 3) and silicon (valency: 4) to Sn of the tin oxide were 0.025, 0.016, 0.01, and 0.017, respectively; no other metallic elements with valencies of 4 or less were detected; and the content (A) calculated by formula (1) was 0.108.

PRODUCTION EXAMPLE 7

Production of Chlorinated Polyolefin Resin for Aqueous Coating Composition

Twelve parts of dimethylethanolamine and 5 parts of a nonionic surfactant (tradename "Noigen EA-140", manufactured by DAI-ICHI KOGYO SEIYAKU CO., LTD.) were added to a mixture (50° C.) of 500 parts of a chlorinated polypropylene (chlorine content: 15%; grafted with 2.0% maleic acid; saponification value: 30 mg KOH/g; weight average molecular weight: 80,000), 150 parts of n-heptane and 50 parts of N-methylpyrrolidone. After stirring at the same temperature for 1 hour, 2,000 parts of deionized water was gradually added, and stirring was continued for another hour. Subsequently, 600 parts of n-heptane and deionized water in total was distilled off at 70° C. under reduced pressure to obtain chlorinated polyolefin emulsion No. 1 with a solids content of 24%.

PRODUCTION EXAMPLE 8

Production of Chlorinated Polyolefin Resin for Aqueous Coating Composition

Using a chlorinated polypropylene (chlorine content: 35%; grafted with 1.9% maleic acid; saponification value: 28 mg KOH/g; weight average molecular weight: 60,000), the procedure of Production Example 7 was repeated to obtain chlorinated polyolefin emulsion No. 2 with a solids content of 24%.

PRODUCTION EXAMPLE 9

Production of Acrylic Resin Solution for Aqueous Coating Composition

Forty parts of ethylene glycol monobutyl ether and 30 parts of isobutyl alcohol were placed in a reaction vessel for acrylic resins equipped with a stirrer, thermometer, reflux condenser, etc., and stirred with heating. When the mixture reached 100° C., the following monomer mixture was added over a period of 3 hours.

| Styrene | 10 parts |
| Methyl methacrylate | 38 parts |
| n-Butyl acrylate | 25 parts |
| 2-Hydroxyethyl methacrylate | 20 parts |
| Acrylic acid | 7 parts |
| 2,2'-Azobisisobutyronitril | 1 part |
| Isobutyl alcohol | 5 parts |

After completion of the addition, the resulting mixture was maintained at 100° C. for 30 minutes, and a mixture of 0.5 parts of 2,2'-azobisisobutyronitrile and 10 parts of ethylene glycol monobutyl ether was added dropwise as an additional catalyst solution over a period of 1 hour. After continued stirring at 100° C. for 1 hour, the mixture was cooled, and 15 parts of isobutyl alcohol was added. When the mixture had cooled to 75° C., 4 parts of N,N-dimethylaminoethanol was added, followed by stirring for 30 minutes, to thereby obtain a water-soluble hydroxy- and carboxy-containing acrylic resin solution with a solids content of 50%. The acrylic resin had a hydroxy value of 86 mg KOH/g, an acid value of 54.5 mg KOH/g and a number average molecular weight of 20,000.

PRODUCTION EXAMPLE 10

Production of Polyester Resin Solution for Organic Solvent-Based Coating Composition 240 parts of phthalic anhydride, 230 parts of trimethylolpropane and 175 parts of coconut oil fatty acid were subjected to an esterification reaction by a standard method to obtain a polyester polyol resin solution. The resin had a hydroxy value of 80 mg KOH/g, an acid value of 15 mg KOH/g and a number average molecular weight of 8,000.

EXAMPLE 1

Production of White Conductive Primer Coating Composition 153 parts of conductive filler No. 1 was added to 18 parts (solids content) of the acrylic resin solution obtained in Production Example 9, and 176 parts of deionized water and 306 parts of glass beads with a diameter of 1 mm were further added. After stirring for 30 minutes in a shaker-type dispersing machine, the glass beads were removed to thereby obtain a dispersion paste.

Forty seven parts (solids content) of chlorinated polyolefin emulsion No. 1 and 35 parts (solids content) of a urethane emulsion (*1) were added to the dispersion paste, followed by thorough agitation in a mixer with agitating blades (tradename "TK Pipeline Homo Mixer Model SL", manufactured by Tokushu Kika Kogyo Co., Ltd., agitating blade diameter: 40 mm). Further, immediately prior to application, 18 parts (solids content) of a hydrophilic hexamethylene diisocyanurate (*2) was added, and the mixture was thoroughly agitated in the mixer with agitating blades to adjust the viscosity to 15 seconds/Ford cup #4/20° C., thus giving aqueous white conductive primer coating composition No. 1.

(*1) and (*2) indicate the following.

(*1) Urethane emulsion: tradename "Sanprene UX-5100A", manufactured by Sanyo Chemical Industries, Ltd.

(*2) Hydrophilic hexamethylene diisocyanurate: tradename "Bayhydur 3100", manufactured by Sumika Bayer Urethane Co., Ltd.

EXAMPLES 2 TO 4

Production of White Conductive Primer Coating Compositions

Following the procedure of Example 1 and using the components shown in Table 1 in the amounts indicated, aqueous white conductive primer coating compositions No. 2 to No. 4 were obtained.

EXAMPLE 5

Production of White Conductive Primer Coating Composition 153 parts of conductive filler No. 1 was added to 18 parts (solids content) of the polyester resin obtained in Production Example 10, and toluene was added until a viscosity suitable for a dispersing operation was attained. The resulting mixture was then stirred for 30 minute in a shaker-type dispersing machine to obtain a dispersion paste.

Fifty nine parts (solids content) of chlorinated polyolefin No. 3 (*3) for an organic solvent-based coating composition, 23 parts (solids content) of the polyester resin obtained in Production Example 10, and 18 parts (solids content) of hexamethylene diisocyanurate (*4) were added to the dispersion paste. The resulting mixture was thoroughly agitated in a mixer with agitating blades to adjust the viscosity to 15 seconds/Ford cup #4/20° C., thus giving organic solvent-based white conductive primer coating composition No. 5.

(*3) and (*4) indicate the following.

(*3) Chlorinated polyolefin No. 3 for an organic solvent-based coating composition: a toluene solution of maleic acid-modified chlorinated polypropylene, having a chlorine content of 20%, an acid value 35 mg KOH/g and a weight average molecular weight of 60,000.

(*4) Hexamethylene diisocyanurate: tradename "Sumidur N3300", manufactured by Sumika Bayer Urethane Co., Ltd.

Table 1 shows the amounts of the components of white conductive primer coating compositions of Examples 1 to 5.

TABLE 1

| | Example | | | | |
| --- | --- | --- | --- | --- | --- |
| | 1 | 2 | 3 | 4 | 5 |
| White conductive primer coating composition | No. 1 | No. 2 | No. 3 | No. 4 | No. 5 |
| Chlorinated polyolefin emulsion No. 1 | 47 | 47 | | | |
| Chlorinated polyolefin emulsion No. 2 | | | 47 | 47 | |
| Chlorinated polyolefin No. 3 (*3) | | | | | 59 |
| Acrylic resin of Production Example 9 | 18 | 18 | 18 | 18 | |
| Polyester resin of Production Example 10 | | | | | 41 |
| Urethane emulsion (*1) | 35 | 35 | 35 | 35 | |
| Hydrophilic hexamethylene diisocyanurate (*2) | 18 | 18 | 18 | 18 | |
| Hexamethylene diisocyanurate (*4) | | | | | 18 |
| Conductive filler No. 1 | 153 | | | | 153 |
| Conductive filler No. 2 | | 153 | | | |
| Conductive filler No. 3 | | | 153 | | |
| Conductive filler No. 4 | | | | 94 | |
| Rutile titanium dioxide (*5) | | | | 59 | |

All the amounts in Table 1 are parts by weight of the solids content.

In Table 1, (*5) indicates the following.

(*5) Rutile titanium dioxide: tradename "JR-903", manufactured by TAYCA CORP.

COMPARATIVE EXAMPLES 1 TO 4

Production of White Conductive Primer Coating Composition

Following the procedure of Example 1 and using the components shown in Table 2 in the amounts indicated, comparative white conductive primer coating compositions No. 6 to No. 9 were obtained.

In Comparative Example 4, however, the resin and pigment components were mixed using a mixer with agitating blades in place of the shaker-type dispersing machine, so as to maintain the shape of the needlelike titanium dioxide whose surfaces were covered with tin dioxide/antimony.

COMPARATIVE EXAMPLE 5

Production of White Conductive Primer Coating Composition 153 parts of conductive filler No. 5 was added to 18 parts (solids content) of the polyester resin obtained in Production Example 10, and toluene was added until a suitable viscosity for a dispersing operation was attained. The resulting mixture was then stirred for 30 minute in a shaker-type dispersing machine to obtain a dispersion paste.

Fifty nine parts (solids content) of chlorinated polyolefin No. 3 (*3) for an organic solvent-based coating composition, 23 parts (solids content) of the polyester resin obtained in Production Example 10, and 18 parts (solids content) of hexamethylene diisocyanurate (*4) were added to the dispersion paste, and the resulting mixture was thoroughly agitated in a mixer with agitating blades to adjust the viscosity to 15 seconds/Ford cup #4/20° C., thus giving organic solvent-based comparative white conductive primer coating composition No. 10.

Table 2 shows the amounts of the components of the white conductive primer coating compositions of Comparative Examples 1 to 5.

TABLE 2

|  | Comparative Example | | | | |
| --- | --- | --- | --- | --- | --- |
|  | 1 | 2 | 3 | 4 | 5 |
| White conductive primer coating composition | No. 6 | No. 7 | No. 8 | No. 9 | No. 10 |
| Chlorinated polyolefin emulsion No. 1 | 47 |  | 47 | 47 |  |
| Chlorinated polyolefin emulsion No. 2 |  | 47 |  |  |  |
| Chlorinated polyolefin No. 3 (*3) |  |  |  |  | 59 |
| Acrylic resin of Production Example 9 | 18 | 18 | 18 | 18 |  |
| Polyester resin of Production Example 10 |  |  |  |  | 41 |
| Urethane emulsion (*1) | 35 | 35 | 35 | 35 |  |
| Hydrophilic hexamethylene diisocyanurate (*2) | 18 | 18 | 18 | 18 |  |
| Hexamethylene diisocyanurate (*4) |  |  |  |  | 18 |
| Conductive filler No. 5 | 153 |  |  |  | 153 |
| Conductive filler No. 6 |  | 153 |  |  |  |
| Conductive carbon (*6) |  |  | 2.9 |  |  |
| Needlelike titanium dioxide whose surfaces were covered with tin dioxide/antimony (*7) |  |  |  | 118 |  |
| Rutile titanium dioxide (*5) |  |  | 153 | 153 |  |

All the amounts in Table 2 are parts by weight of the solids content.

In Table 2, (*6) and (*7) indicate the following.

(*6) Conductive carbon: tradename "Ketjenblack EC600J, manufactured by Lion Corp.)

(*7) Needlelike titanium dioxide whose surfaces were covered with tin dioxide/antimony: tradename "Dentall WK500", manufactured by Otsuka Chemical Co., Ltd.

Coating Tests

Using white conductive primer coating compositions No. 1 to No. 5 of the present invention obtained in Examples 1 to 5 and comparative white conductive primer coating compositions No. 6 to No. 10 obtained in Comparative Examples 1 to 5, multilayer coating films were formed by the following coating steps 1 and 2.

Coating step 1: Black polypropylene was molded into bumper shapes, degreased, and used as plastic substrates. White conductive primer coating compositions No. 1 to No. 10 were applied to the substrates by air spraying to a thickness of 20 μm (when cured). The applied coating layers were allowed to stand at room temperature for 1 minute, preheated at 80° C. for 3 minutes, and cured by heating at 120° C. for 20 minutes. The L* value and surface electrical resistance of the cured coating layers were measured by the methods described hereinbelow.

Coating step 2: An aqueous thermosetting transparent colored coating composition (tradename "WBC-710 Mica Base", manufactured by Kansai Paint Co., Ltd.) was electrostatically applied to the cured coating layer obtained in coating step 1 to a thickness of 15 to 20 μm (when cured) and preheated at 80° C. for 3 minutes. Subsequently, an organic solvent-based acrylic resin/urethane resin thermosetting clear coating composition (tradename "Soflex #520 Clear", manufactured by Kansai Paint Co., Ltd.) was applied to the uncured transparent colored coating layer to a thickness of 25 μm (when cured), allowed to stand at room temperature for 5 minutes, and heated at 120° C. for 30 minutes to simultaneously cure the colored coating layer and clear coating layer, thereby giving a multilayer coating film.

The L* value and surface electrical resistance were measured by the following methods.

L* value: The coating layer of the white conductive primer coating composition was cured by heating at 120° C. for 20 minutes. The L* value according to the L*a*b* color system defined in JIS Z 8729 of the cured coating layer was measured using a colorimeter (tradename "Color Computer SM-7", manufactured by Suga Test Instruments Co., Ltd.).

Surface electrical resistance: A white conductive primer coating composition was applied and cured by heating, and the surface electrical resistance of the cured coating layer was measured using an electrical resistance meter (tradename "MODEL 150", manufactured by TREK). When the measured value is less than $10^9$ Ω/sq., the transparent colored coating composition can be electrically applied on the cured coating layer.

Table 3 shows the results of testing the coating layers of the white conductive primer coating compositions of the present invention obtained in Examples 1 to 5.

TABLE 3

|  | Example | | | | |
| --- | --- | --- | --- | --- | --- |
|  | 1 | 2 | 3 | 4 | 5 |
| White conductive primer coating composition | No. 1 | No. 2 | No. 3 | No. 4 | No. 5 |
| L* value | 82 | 81 | 86 | 88 | 83 |

TABLE 3-continued

|  | Example | | | | |
|---|---|---|---|---|---|
|  | 1 | 2 | 3 | 4 | 5 |
| Surface electrical resistance (Ω/sq.) | $1 \times 10^7$ | $1 \times 10^7$ | $1 \times 10^8$ | $7 \times 10^8$ | $1 \times 10^8$ |

Table 4 shows the results of testing the coating layers of the comparative white conductive primer coating compositions of Comparative Examples 1 to 5.

TABLE 4

|  | Comparative Example | | | | |
|---|---|---|---|---|---|
|  | 1 | 2 | 3 | 4 | 5 |
| White conductive primer coating composition | No. 6 | No. 7 | No. 8 | No. 9 | No. 10 |
| L* value | 78 | 76 | 61 | 55 | 80 |
| Surface electrical resistance (Ω/sq.) | $1 \times 10^{10}$ | $3 \times 10^{10}$ | $1 \times 10^8$ | $1 \times 10^8$ | $1 \times 10^{10}$ |

In coating step 2 of the coating test, the coating layers of comparative white conductive primer coating compositions No. 6, No. 7 and No. 10 were not able to be electrostatically coated with the colored coating composition and clear coating composition, due to the high surface electrical resistance of $10^{10}$ Ω/sq. or more.

Multilayer coating films No. 1 to No. 7 obtained by coating steps 1 and 2 using the white conductive primer coating compositions of Examples 1 to 5 and Comparative Examples 3 and 4 were tested, by the following methods, for film appearance, N value according to the Munsell color system defined in JIS Z 8721, and film performance (adhesion and water resistance).

Film appearance: The perpendicular portion of the coated substrate was checked for abnormalities (sagging, after tack and blistering) of the coating film by the naked eye, and evaluated by the following criteria.

A: none of the above abnormalities was observed; B: one or more of the abnormalities (sagging, after tack and blistering) were observed; C: one or more of the-abnormalities (sagging, after tack and blistering) were remarkable.

N value according to the Munsell color system defined in JIS Z 8721: The N value in the Munsell chart of the three-layer coating film consisting of the white primer coating layer, transparent colored coating layer and clear coating layer was determined. 0 is black and 10 is pure white.

Adhesion: In the multilayer coating film consisting of three layers, i.e., the white conductive primer coating layer, transparent colored coating layer and clear coating layer, cuts reaching the substrate were made with a cutter so as to form 100 squares of a width of 2 mm, and an adhesive tape was adhered to the cut surface, and rapidly peeled off at 20° C. The number of the remainder of the 100 squares was counted. A greater number of the remainder indicates higher adhesion.

Water resistance: The multilayer coating film consisting of three layers, i.e., the white conductive primer coating layer, transparent colored coating layer and clear coating layer, was immersed in warm water at 40° C. for 240 hours, and cuts reaching the substrate were made in the coating film with a cutter so as to form 100 squares of a width of 2 mm. An adhesive tape was adhered to the cut surface and rapidly peeled off at 20° C. The number of the remainder of the 100 squares was counted. A greater number of the remainder indicates higher water resistance.

Table 5 shows the results of the performance test of the multilayer coating films.

TABLE 5

| White conductive primer coating | Example | | | | | Comparative Example | |
|---|---|---|---|---|---|---|---|
| Composition | 1 | 2 | 3 | 4 | 5 | 3 | 4 |
| Multilayer coating film No. | No. 1 | No. 2 | No. 3 | No. 4 | No. 5 | No. 6 | No. 7 |
| Film appearance | A | A | A | A | A | A | A |
| N value | 8.5 | 8.5 | 9.0 | 9.0 | 8.5 | 6.0 | 5.5 |
| Adhesion | 100 | 100 | 100 | 100 | 100 | 100 | 100 |
| Water resistance | 100 | 100 | 100 | 100 | 100 | 100 | 100 |

The invention claimed is:

1. A white conductive primer coating composition comprising:
  (a) 100 parts by weight of a resin mixture of a chlorinated polyolefin resin with a chlorine content of 10 to 40 wt. %, and at least one modifier resin selected from the group consisting of acrylic resins, polyester resins and polyurethane resins;
  (b) 5 to 50 parts by weight of a crosslinking agent; and
  (c) 10 to 250 parts by weight of a white conductive titanium dioxide powder which comprises titanium dioxide particles having on their surfaces a conductive layer comprising tin oxide and phosphorus, and in which the content (A) of metallic elements with valencies of 4 or less contained as impurities is no more than 0.1; the content (A) being calculated by the following formula (1)

$$(A) = (M_1) \times (4-n_1) + (M_2) \times (4-n_2) + (M_3) \times (4-n_3) + (M_4) \times (4-n_4) + \ldots + (M_X) \times (4-n_X) \quad \text{Formula (1)}$$

wherein $M_1, M_2, M_3, M_4, \ldots M_X$ are the atomic ratios of metallic elements with valencies of 4 or less to Sn of the tin oxide in the white conductive titanium dioxide powder; $n_1, n_2, n_3, n_4, \ldots n_X$ are the valencies of metallic elements having atomic ratios of $M_1, M_2, M_3, M_4, \ldots M_X$, respectively; and X in $M_X$ and $n_X$ is the number of such metallic elements contained in the white conductive titanium dioxide powder, and may be a natural number 1 or more.

2. A primer coating composition according to claim 1, wherein, in component (a), the proportions of the chlorinated polyolefin resin and modifier resin are 10 to 90 wt. % and 90 to 10 wt. %, respectively, of the total weight of these resins.

3. A primer coating composition according to claim 1, wherein, in the white conductive titanium dioxide powder (c), the amount of tin oxide in the conductive layer is 0.015 to 0.3 g on a $SnO_2$ basis per square meter of surface area of the titanium dioxide.

4. A primer coating composition according to claim 1, wherein, in the conductive layer of the white conductive titanium dioxide powder (c), the proportion of phosphorus to tin oxide is from 0.10 to 0.50 in terms of the P/Sn atomic ratio.

5. A primer coating composition according to claim 1, wherein, in the white conductive titanium dioxide powder (c), the content (B) of metallic elements with valencies of 4 or less contained as impurities in the titanium dioxide is no more than 0.02; the content (B) being calculated by the following formula (2):

$$(B) = (M'_1) \times (4-n'_1) + (M'_2) \times (4-n'_2) + (M'_3) \times (4-n'_3) + (M'_4) \times (4-n'_4) + \ldots + (M'_Y) \times (4-n'_Y) \quad \text{Formula (2)}$$

wherein $M'_1, M'_2, M'_3, M'_4, \ldots M'_Y$ are the atomic ratios of metallic elements with valencies of 4 or less to Ti of the titanium dioxide; $n'_1, n'_2, n'_3, n'_4, \ldots n'_Y$ are the valencies of metallic elements with atomic ratios of $M'_1, M'_2, M'_3, M'_4, \ldots M'_Y$ respectively; and Y in $M'_Y$ and $n'_Y$ is the number of metallic elements contained in the titanium dioxide, and may be a natural number 1 or more.

6. A primer coating composition according to claim 1, further comprising (d) up to 200 parts by weight of a white pigment.

7. A primer coating composition according to claim 1, the composition being capable of forming a coating layer with a lightness (L* value) of 80 or more as determined according to the L*a*b* color system defined in JIS Z 8729, by being applied to a plastic substrate and cured by heating.

8. A primer coating composition according to claim 1, the composition, when formed into an uncured or cured coating layer applied on a plastic substrate, having a surface electrical resistance less than $10^9$ Ω/sq.

9. A primer coating composition according to claim 1, which is an aqueous coating composition.

10. A method for forming a multilayer coating film, the method comprising the steps of:
   (1) applying a white conductive primer coating composition according to claim 1 to a plastics substrate;
   (2) electrostatically applying a colored base coating composition on the uncured coating layer of the primer coating composition;
   (3) electrostatically applying a clear coating composition on the uncured coating layer of the base coating composition; and then
   (4) curing by heating the three-layer coating comprising the primer coating composition, colored base coating composition and clear coating composition.

11. A method for forming a multilayer coating film, the method comprising the steps of:
   (1) applying a white conductive primer coating composition according to claim 1 to a plastics substrate, followed by curing by heating;
   (2) electrostatically applying a colored base coating composition on the cured coating layer of the primer coating composition;
   (3) electrostatically applying a clear coating composition on the uncured coating layer of the base coating composition; and then
   (4) curing by heating the two-layer coating comprising the colored base coating composition and clear coating composition.

* * * * *